United States Patent [19]
Ross et al.

[11] Patent Number: 5,824,255
[45] Date of Patent: Oct. 20, 1998

[54] HONEYCOMB CORE FORMING PROCESS

[75] Inventors: William T. Ross, Cheney; Bradley J. Blonigen, Wichita, both of Kans.

[73] Assignee: The Boeing Company, Seattle, Wash.

[21] Appl. No.: 651,473

[22] Filed: May 21, 1996

Related U.S. Application Data

[62] Division of Ser. No. 330,490, Oct. 28, 1994, Pat. No. 5,529,480.

[51] Int. Cl.$^6$ .................................................. B29C 33/58
[52] U.S. Cl. .......................... 264/316; 264/321; 264/322; 425/398
[58] Field of Search .................................... 264/316, 321, 264/322; 425/400, 398

[56] References Cited

U.S. PATENT DOCUMENTS

| | | |
|---|---|---|
| 2,385,544 | 9/1945 | Salisbury . |
| 2,443,596 | 6/1948 | Cahill . |
| 2,456,675 | 12/1948 | Chaille . |
| 2,783,815 | 3/1957 | Tegarden . |
| 2,882,952 | 4/1959 | Johnson . |
| 2,948,327 | 8/1960 | Horner . |
| 3,557,277 | 1/1971 | Brodersen et al. ...................... 264/316 |
| 3,658,974 | 4/1972 | Low ........................................ 264/316 |
| 4,160,006 | 7/1979 | Patzner et al. . |
| 4,350,551 | 9/1982 | Michaelson . |
| 4,789,328 | 12/1988 | Knoll . |
| 4,883,632 | 11/1989 | Goto et al. . |
| 4,885,317 | 12/1989 | Thein et al. . |
| 5,084,226 | 1/1992 | Tarlton et al. . |
| 5,119,535 | 6/1992 | Gnagy et al. . |
| 5,385,699 | 1/1995 | Numoto et al. ......................... 264/322 |
| 5,529,480 | 6/1996 | Ross et al. . |

FOREIGN PATENT DOCUMENTS

| | | |
|---|---|---|
| 0 393 767 A3 | 10/1990 | European Pat. Off. . |
| 3 393 767 A2 | 10/1990 | European Pat. Off. . |
| A-41 30 620 | 2/1993 | Germany . |
| A-59 022 717 | 6/1984 | Japan . |
| WO-A-95/03933 | 2/1995 | WIPO . |

Primary Examiner—Jan H. Silbaugh
Assistant Examiner—Mark Eashoo
Attorney, Agent, or Firm—Paul C. Cullom, Jr.

[57] ABSTRACT

A process of forming and shaping a preheated workpiece made of honeycomb core material using a press including complementary male and female dies. The first step of the process is providing a carrier sheet for supporting the workpiece. The carrier sheet is suspended over the female die by two shafts supported by support towers. The next step is loading the preheated workpiece onto the carrier sheet. The next step is applying rotational torque to each of the two shafts whereby the carrier sheet is wrapped around the said shafts thereby applying tension to the carrier sheet and pulling the shafts toward each other and into pressing contact with the sides of the workpiece while said carrier sheet means supports the bottom surface of said workpiece. The next step is closing the male die and the female die against the workpiece while maintaining the shafts in pressing contact with the sides of the workpiece and while the carrier sheet supports the bottom surface of the workpiece, whereby the workpiece is formed and shaped by the complementary male and female dies into a formed workpiece of the desired shape. The final step is opening the male and female dies and removing the formed workpiece.

2 Claims, 10 Drawing Sheets

5,824,255

HONEYCOMB CORE FORMING PROCESS

This is a divisional of application Ser. No. 08/330,490 filed on Oct. 28, 1994, now U.S. Pat. No. 5,529,480.

BACKGROUND OF THE INVENTION

1. Field of the Invention

This invention relates to an apparatus and process for forming tight radii in stiff honeycomb core material using a molding press and honeycomb forming dies. The invention enables the formation of radii that are tighter than those which can be formed using currently available methods.

2. Description of the Background Art

Prior to this invention, for applications where a tight radius or curvature in the finished honeycomb core material was required, either a flexible honeycomb core material or a build-up of honeycomb wedges bonded together was used instead of one piece of stiff honeycomb core material because of the inability to form stiff honeycomb core material in a tight radius without causing damage to the honeycomb core material, specifically, the damage would be core splits or cell separation at the cell nodes.

SUMMARY OF THE INVENTION

The present invention, which we call the honeycomb core forming restricter, solves the foregoing problem and provides a means of forming stiff honeycomb core material in a variety of tight radii without causing cell separation at the cell nodes.

In one aspect, the invention is a process of forming and shaping a preheated workpiece made of honeycomb core material having a top, a bottom, and side surfaces. The process uses a press including complementary male and female dies. The first step of the process is providing a carrier sheet for supporting the workpiece. The carrier sheet is suspended over the female die by two shafts supported by support towers. The next step is loading the preheated workpiece onto the carrier sheet. The next step is applying rotational torque to each of the two shafts whereby the carrier sheet is wrapped around the shafts thereby applying tension to the carrier sheet and pulling the shafts toward each other and into pressing contact with the sides of the workpiece while the carrier sheet supports the bottom surface of the workpiece. The next step is closing the male die and the female die against the workpiece while maintaining the shafts in pressing contact with the side surfaces of the workpiece and while the carrier sheet supports the bottom surface of the workpiece, whereby the workpiece is formed and shaped by the complementary male and female dies. The final step is opening the male die and the female die and removing the formed workpiece.

In another aspect, the invention is a process of forming and shaping a preheated workpiece made of honeycomb core material having a top, a bottom, and side surfaces into a curved shape in the horizontal plane. The process uses a press including complementary male and female dies and having a curved vertical retaining wall on one side of the female die. The first step of the process is providing a carrier sheet for supporting the workpiece. The carrier sheet is suspended over the female die by two shafts supported by support towers. The next step is loading said the preheated workpiece onto the carrier sheet. The next step is applying rotational torque to each of the two shafts means whereby the carrier sheet is wrapped around the shafts thereby applying tension to the carrier sheet and pulling the shafts toward each other and into pressing contact with the side surfaces of the workpiece while the carrier sheet supports the bottom surface of the workpiece. The next step is forcing one of the shafts and the workpiece against the curved vertical retaining wall thereby causing the workpiece to take on the curved shape in the horizontal plane of the retaining wall. The next step is closing the male die and the female die against the workpiece while maintaining the shafts in pressing contact with the side surfaces of the workpiece while the carrier sheet supports the bottom surface of the workpiece, whereby the workpiece is formed and shaped by the complementary male and female dies into a formed workpiece of the desired shape. The final step is opening the male die and the female die and removing the formed workpiece.

BRIEF DESCRIPTION OF THE DRAWINGS

For a better understanding of the invention, and to show how the same may be carried into effect, reference will now be made, by way of example, to the accompanying drawings. In the different figures, elements designated by like reference numerals have corresponding functions.

FIG. 2 is a simplified vertical sectional view showing a press including a male die and a raw workpiece of stiff honeycomb core material placed in a female die. As stated above, FIG. 2 does not show the present invention.

FIG. 3 is a simplified vertical sectional view of the apparatus of FIG. 2 where the male die has partially descended against the workpiece of stiff honeycomb core material. As stated above, FIG. 3 does not show the present invention.

FIG. 4 is a simplified vertical sectional view of the apparatus of FIG. 2 where the male die has fully descended against the workpiece of stiff honeycomb core material. As stated above, FIG. 4 does not show the present invention.

FIG. 5 is a perspective view of the defective product of stiff honeycomb core material produced in FIG. 4. FIG. 5 shows the core splits caused by cell separation at the cell nodes of the stiff honeycomb core material. As stated above, FIG. 5 is not the product of the present invention.

FIG. 6 is a simplified vertical sectional view of a press including a male die, a raw workpiece of stiff honeycomb core material located between the male die and the honeycomb core forming restricter of the present invention, and a female die.

In FIG. 6A, the longitudinal shafts of the honeycomb core forming restricter are pressing against the longitudinal sides of the workpiece.

FIG. 7 is a simplified vertical sectional view of the apparatus of FIG. 6A where the male die has partially descended and is touching the workpiece of stiff honeycomb core material supported on the honeycomb core forming restricter of the present invention, and the female die. In FIG. 7, the honeycomb core forming restricter also continues to press against the sides of the workpiece.

FIG. 8 is a simplified vertical sectional view of the apparatus of FIG. 7 where the male die has descended further against the workpiece of stiff honeycomb core material supported on the honeycomb core forming restricter of the present invention, and the female die. In FIG. 8, the male die has forced the honeycomb core forming restricter down against the female die and the forming of the workpiece has started while the honeycomb core forming restricter continues to press against the sides of the workpiece.

FIG. 9 is a simplified vertical sectional view of the apparatus of FIG. 8 showing the male die now fully descended against the workpiece and the female die. The forming of the workpiece by the male and female dies is complete and the longitudinal shafts of the honeycomb core forming restricter may now be relaxed.

FIG. 10 is a perspective view of the finished honeycomb core product produced in FIGS. 6–9 using the honeycomb core forming restricter of the present invention.

FIG. 12 is a perspective view of the honeycomb core forming restricter, the honeycomb core workpiece, and the female die. FIG. 12 shows the first step of the process that is to locate the honeycomb core workpiece in the proper location.

FIG. 13 is a top view of the apparatus shown in FIG. 12.

FIG. 14 is a perspective view of the honeycomb core forming restricter, the honeycomb core workpiece, and the complex contour female die. FIG. 14 shows the second stage of the process that is to form the ribbons in-plane prior to forming the complex contour in the workpiece.

FIG. 15 is a plan view of the apparatus shown in FIG. 14.

DESCRIPTION OF THE PREFERRED EMBODIMENTS

Figure 2:
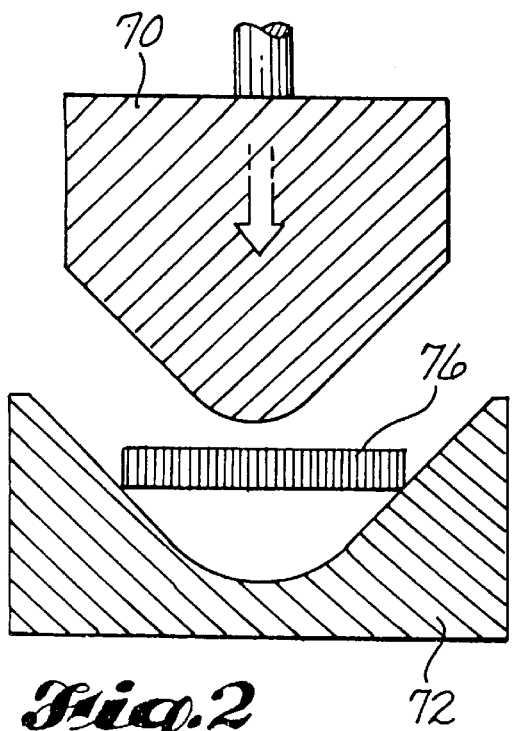
FIGS. 2–5 show a currently available method that does not employ the present invention and that produces a defective product having core splits (shown in FIG. 5).

Before describing the preferred embodiments, it is useful to describe the basic problem that is solved by the present invention. FIGS. 2–5 show the problem in that these drawings show a currently available method that produces a defective honeycomb core product having core splits. FIG. 2 shows a press including a male die 70 and a preheated raw workpiece 76 of stiff honeycomb core (for example, carbon composite honeycomb core) placed in a female die 72.

Figure 3:
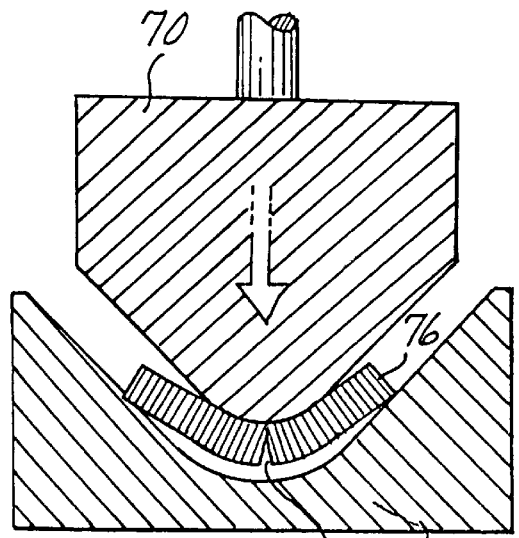
Figure 4:
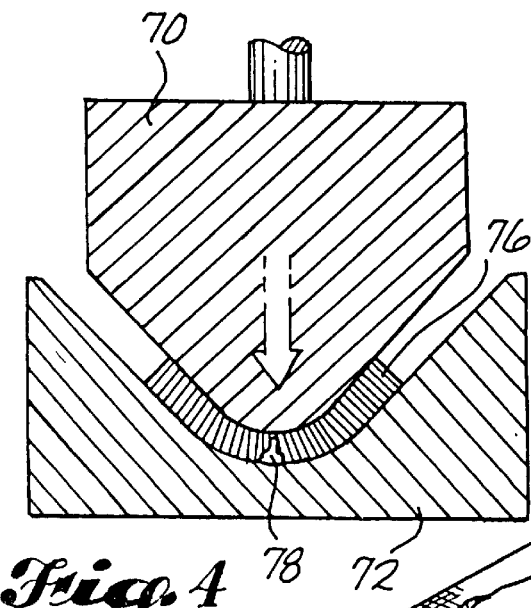
Figure 5:
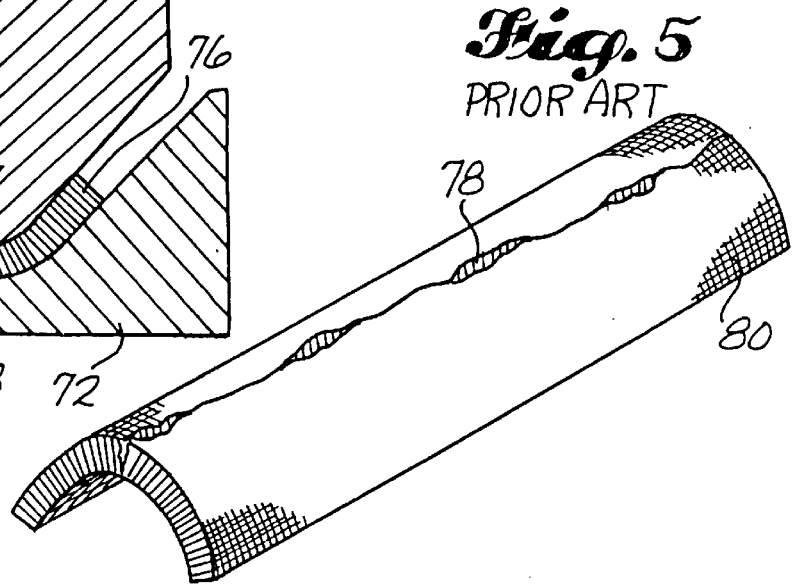

FIG. 3 shows the male die 70 partially descended against the workpiece 76 that is now being shaped against female die 72. At this stage in FIG. 3, a core split 78 is beginning to occur in workpiece 76. FIG. 4 shows male die 70 fully descended against workpiece 76 that is now shaped against female die 72 and core split 78 is complete. The result is defective product 80 having core split 78 as shown in FIG. 5. Having thus described the basic problem represented by defective product 80, the preferred embodiments will now be described.

The Portable Version Of The Apparatus

Figure 1:
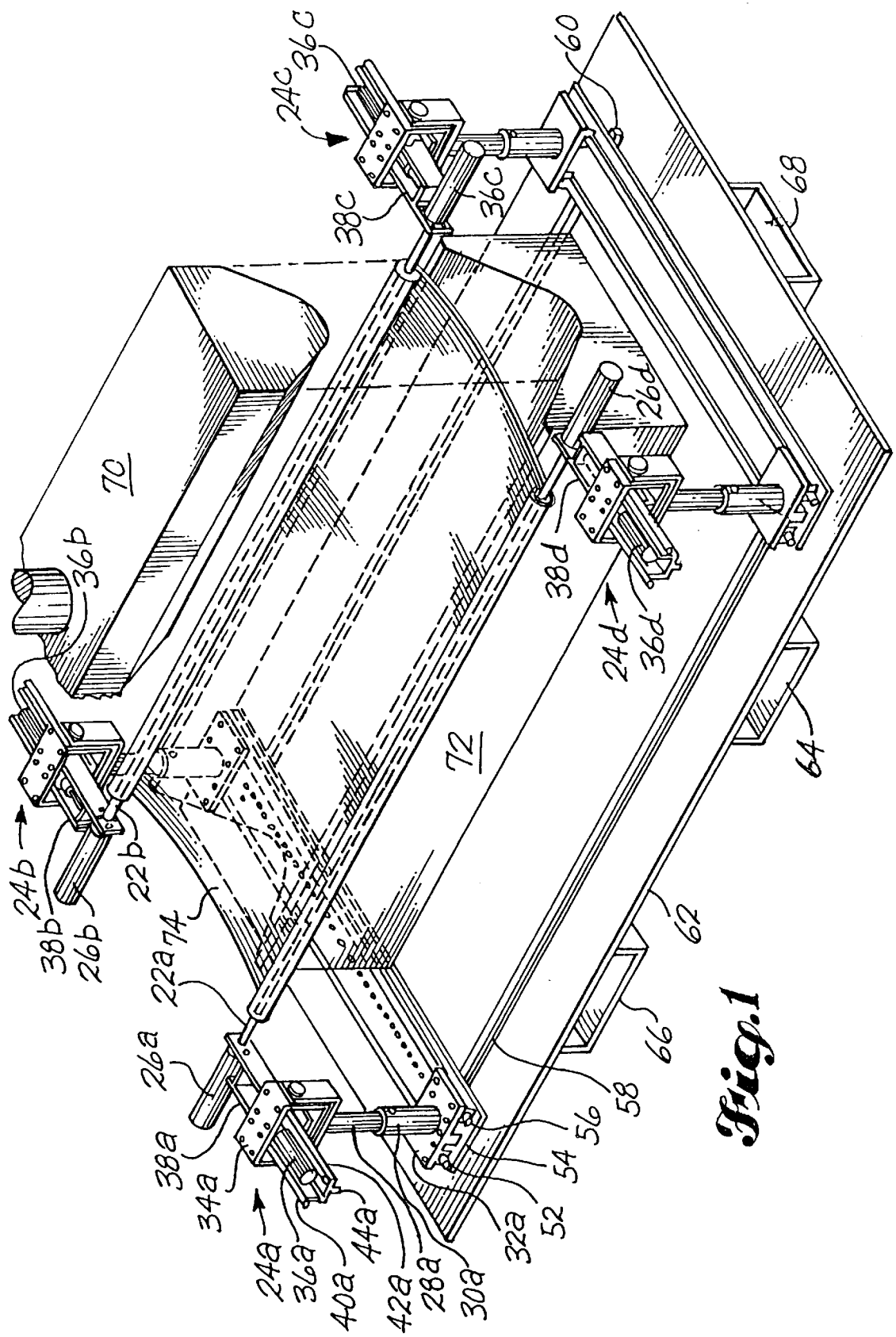
FIG. 1 is a simplified perspective view showing a portable honeycomb core forming restricter in combination with a press including a male die (shown partially cutaway) and a female die.

FIG. 1 shows a portable version of the honeycomb core forming restricter 20 constructed according to the principles of the invention. Apparatus 20 includes a left longitudinal shaft 22a and a right longitudinal shaft 22b that are arranged in a generally parallel relationship to each other and with respect to the longitudinal axis of the female die 72 as shown in FIG. 1. Apparatus 20 is designed to be portable or removable so that it can be removed and the press can be used for other tasks, but portability is not a requirement of the invention.

Shaft 22a is connected at one end to pneumatic or air motor 26a supported on arm 38a that is part of support tower assembly 24a. The opposite end of shaft 22a is connected to air motor 26d supported on arm 38d that is part of support tower assembly 24d. Similarly shaft 22b is connected at one end to air motor 26b supported on arm 38b that is part of support tower assembly 24b. The opposite end of shaft 22b is connected to air motor 26c supported on arm 38c that is part of support tower assembly 24c. Support tower assemblies 24a, 24b, 24c, and 24d are constructed similarly.

The longitudinal shafts 22a and 22b can be constructed of either a rigid material, for making a simple contour honeycomb product, or they can be constructed of a semi-flexible material, for making a complex contour honeycomb product. The shafts need to be strong and rigid enough to carry the torque applied to them by the air motors and to exert the side pressure required of them. The semi-flexible type needs to be flexible enough to follow the desired contour of the dies. For example, the preferred material for the semi-flexible shafts is unreinforced ULTEM, a polyetherimide resin marketed by GE Plastics.

Figure 6:
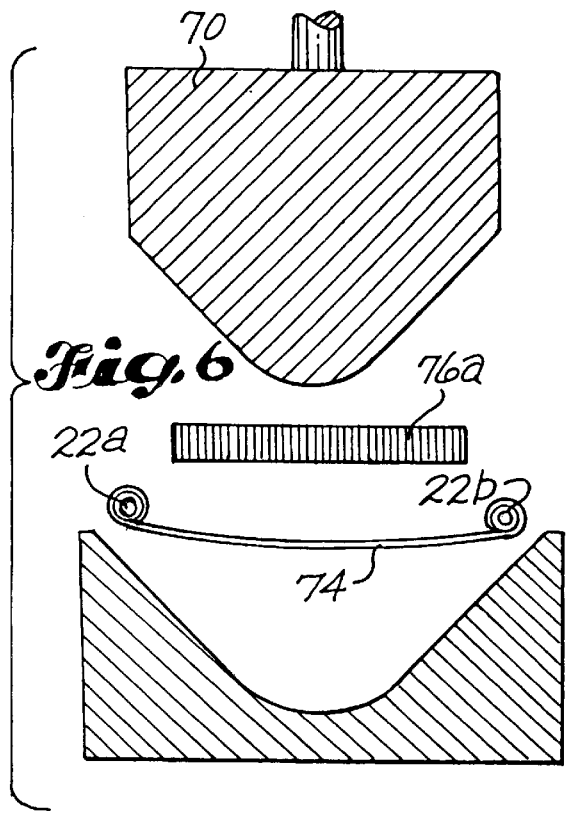
FIGS. 6–10 are simplified drawings that show a process for using the present invention to form a stiff honeycomb core workpiece into a simple contour (the product shown in FIG. 10).
Figure 8:
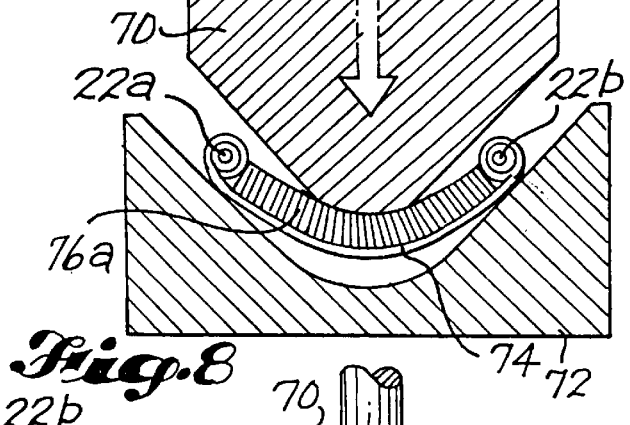

As shown in FIGS. 1 and 6, extending between and wrapped around longitudinal shafts 22a and 22b is a carrier sheet 74 made of a high temperature-resistant material. The carrier sheet 74 supports the preheated workpiece 76a of stiff honeycomb core material (for example, carbon composite honeycomb core) on its convex side as shown in FIG. 8, thereby reducing the tensile strain in the honeycomb core, and thereby preventing the core split problem shown in FIG. 5. The material used to make carrier sheet 74 has the following minimum properties. First, the material is strong enough to carry the required tension for workpiece support. Second, the material has a minimum amount of elasticity to give it the ability to elongate slightly as required by the operating conditions encountered in this process. Third, the material needs to be compliant and flexible enough to follow the desired contour. Fourth, the material needs to be high temperature resistant to withstand the preheated honeycomb core (for example, the material needs to withstand temperatures up to 750° F. for a short period of time). For example, one type of suitable material for the carrier sheet 74 is a silicone rubber sheet made by the Mosites Corporation of Fort Worth, Tex. in a 0.1 inch thickness. Another suitable material is a woven fiberglass material having a non-stick release coating sold under the name Bleederelease E in 5–10 mil (0.005–0.010 inch) thickness. The preferred material for carrier sheet 74 is a polyimide film sold under the trademark UPILEX R, supplied by ICI Films, in a 5 mil (0.005 inch) thickness.

Figure 6A:
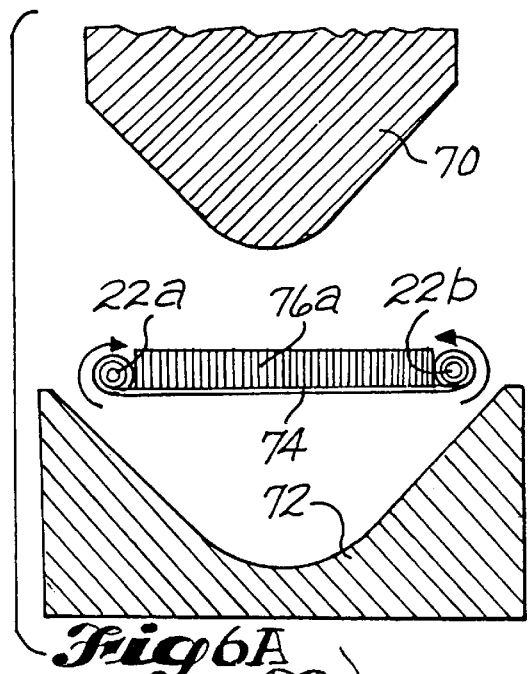
FIG. 6A is a simplified vertical sectional view of the apparatus of FIG. 6 showing the male die, the raw workpiece of stiff honeycomb core material supported on the honeycomb core forming restricter of the present invention, and the female die.

The honeycomb core forming restricter 20 is placed in between the honeycomb core forming dies of a press that includes a male die 70 and a female die 72 as shown in FIGS. 1 and 6. The honeycomb core forming restricter 20 is located so that shafts 22a and 22b are typically, but not necessarily, equidistant from the longitudinal axis of the female die 72 as shown in FIG. 6. The raw workpiece 76a of stiff honeycomb core material of FIG. 6 must first be preheated to a desired softening temperature, such as up to 750° F., as specified by the manufacturer of the specific honeycomb core material being employed. The heating softens the stiff honeycomb core and makes it more flexible. The honeycomb core workpiece 76a, after preheating, is then placed on the carrier 74 and the shafts 22a and 22b are rotated as shown in FIG. 6A by torque applied to the shafts by air motors 26a, 26d, 26b, and 26c. This rotation of the shafts 22a and 22b wraps the carrier sheet 74 around the shafts and applies tension to the carrier sheet 74. The rotation of the shafts and the application of tension to carrier sheet 74 pulls the wrapped shafts 22a and 22b toward each other and into pressing contact with the longitudinal sides of the honeycomb core workpiece 76a as shown in FIG. 6A.

Figure 7:
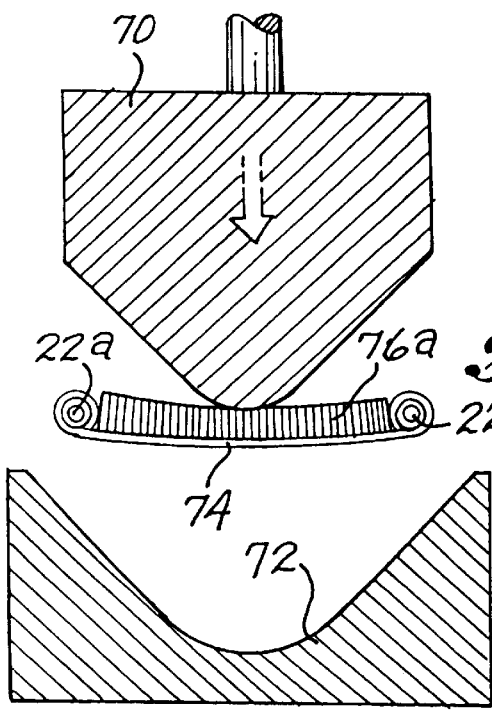
Figure 9:
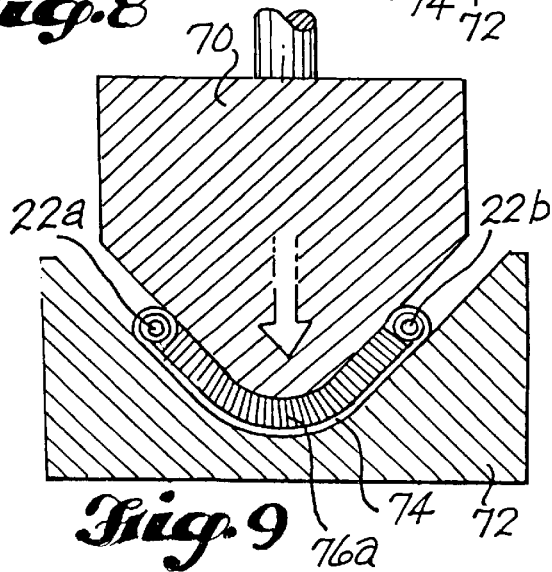

The bottom surface of the honeycomb core workpiece 76a rests directly on the top surface of the carrier sheet 74 as shown in FIG. 6A. While the shafts 22a and 22b apply a compressive preload and prevent any outward movement of the honeycomb core workpiece 76a, the honeycomb core forming male die 70 and female die 72 are pressed together progressively as shown in FIGS. 7–9. The radius of the male die 70 will meet the upper surface of the honeycomb core workpiece 76a forcing it down into the radius of the female die 72 as shown in FIG. 8, thus forming the honeycomb core workpiece 76a in FIG. 9.

Figure 10:
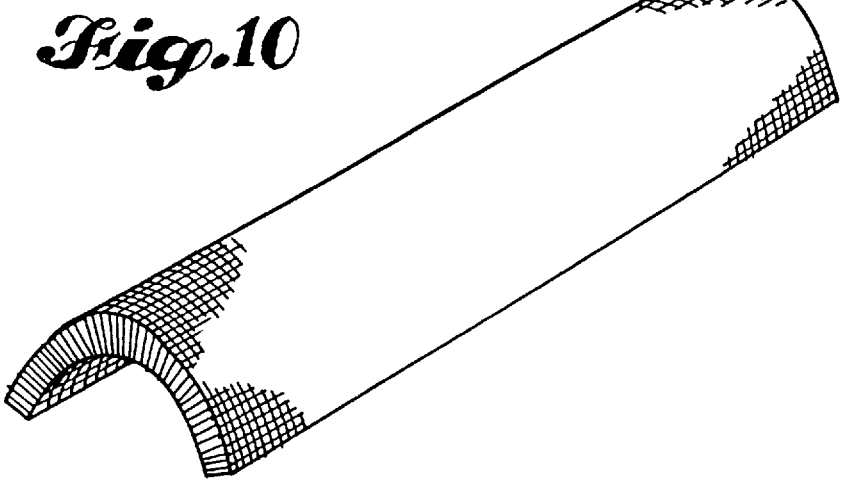

The high temperature-resistant carrier sheet 74 is flexible enough to allow the honeycomb core workpiece 76a to be pressed down, and strong enough to hold the shafts 22a and 22b at a constant distance, thus preventing the honeycomb core cells from separating at the cell nodes and thus preventing the core split problem shown in FIG. 5. Because of the restriction of any sideways outward movement by the honeycomb core workpiece 76a by the wrapped shafts 22a and 22b, the cells on the upper surface the honeycomb core workpiece 76a are caused to condense in on themselves in a uniform manner. The shafts 22a and 22b may be relaxed as soon as the dies are closed. After allowing a few minutes for the honeycomb ore workpiece 76a to cool in FIG. 9, the honeycomb core forming male die 70 and female die 72 can be opened and the workpiece removed. The useful finished honeycomb core formed product 82 shown in FIG. 10 is the result.

As shown in FIG. 1, support tower assembly 24a includes air motor 26a mounted on the interior end of arm 38a. Arm 38a slides in and out of pivoting mount 48a in a transverse direction on slide rails 40a, 42a, and 44a mounted the sides and bottom of arm 38a. The term "transverse direction" in this context refers to motion in a direction that is transverse with respect to the longitudinal axis of female die 72. Because arms 38a and 38d support shaft 22a, movement of arms 38a and 38d in a transverse direction moves the axis of shaft 22a in a direction that is transverse to female die 72. The slide rails 40a, 42a, and 44a move in pillow blocks that are mounted on the sides and bottom within the U-shaped pivoting mount 48a.

Pivoting mount 48a pivots or rotates in an arc that is in a plane that is transverse to the longitudinal axis of female die 72, therefore arm 38a also pivots or rotates in an arc that is in a plane that is transverse to the longitudinal axis of female die 72. Because arms 38a and 38d support shaft 22a, the pivoting of arms 38a and 38b in an arc that is in a plane that is transverse to the longitudinal axis of female die 72 also moves the centerpoint of shaft 22a in an arc that is in a plane that is transverse to female die 72. (Further construction details of the support tower assembly can also be seen in is FIG. 11, an exploded view of similar support tower assembly 24b that will be described below.) As shown in FIG. 1, cap plate 34a is mounted on top of pivoting mount 48a. A double-acting pneumatic or air cylinder 36a is mounted underneath cap plate 34a and is connected to arm 38a. Thus, actuating the air cylinder 36a will extend or retract the arm 38a in the lateral direction described above. Fixed mount 50a carries pivot pin 46a upon which pivoting mount 48a pivots or rotates in the arc described above.

As further shown in FIG. 1, fixed mount 50a is supported on top of upper support column 28a. Upper support column 28a telescopes within lower support column 30a which thereby provides a vertical height adjustability to tower assembly 24a. Lower support column 28a is mounted on adapter base plate 32a. Adapter base plate 32a carries pillow blocks on its lower side that slide on the outer lateral rail 52 and the inner lateral rail 56 that are mounted on rail support base plate 54. This construction provides the ability to move tower assembly 24a in the lateral direction on lateral rails 52 and 56.

FIG. 1 also shows that rail support base plate 54 is slidably mounted on left longitudinal slide rail 58 and right longitudinal slide rail 60 that are mounted on top of base plate 62. This provides the ability to move tower assemblies 24a and 24b in the longitudinal direction on longitudinal rails 58 and 60. Base plate 62 is reinforced by channel members 64, 66, and 68.

Figure 11:
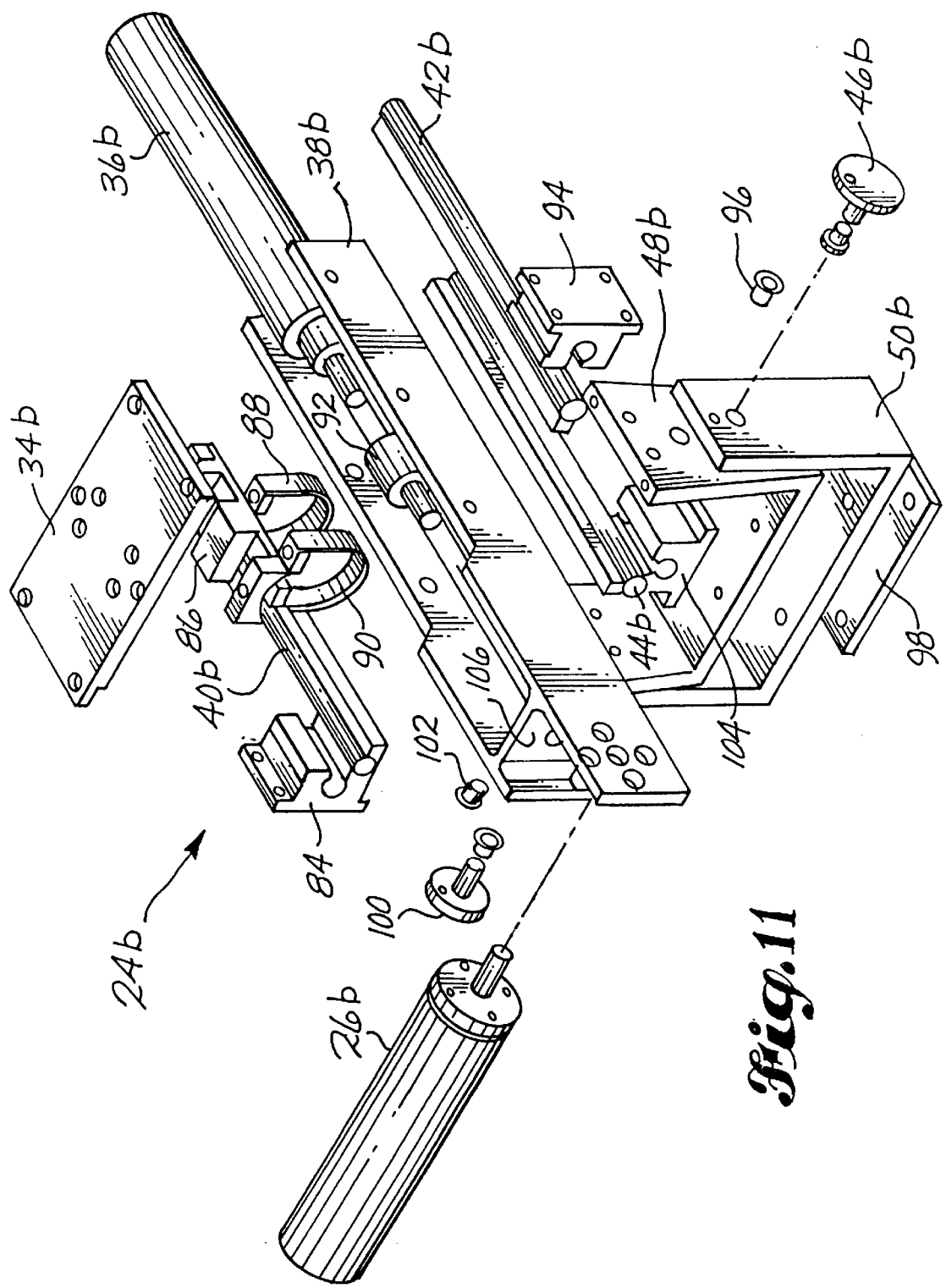
FIG. 11 is an exploded view of a support tower assembly of the honeycomb core forming restricter.

The construction details of the upper portion of support tower assembly 24b are shown in exploded view FIG. 11. As shown in FIG. 11, support tower assembly 24b includes air motor 26b that is mounted on the interior end of arm 38b. Arm 38b slides in and out of pivoting mount 48b in a transverse direction on slide rails 40b, 42b, and 44b that are mounted on the sides and bottom of arm 38b. The slide rails 40b, 42b, and 44b move in pillow blocks 84, 94, and 104, respectively, which are mounted on the sides and bottom within the U-shaped pivoting mount 48b.

As shown in FIG. 11, cap plate 34b is mounted on top of pivoting mount 48b. A double-acting air cylinder 36b is mounted underneath cap plate 34b. Strap mount 86 is secured to the bottom side of cap plate 34b and straps 88 and 90 are secured to strap mount 86. Air cylinder 36b is held by straps 88 and 90. The rod of air cylinder 36b is connected to coupling 92 that is connected to the vertical wall 106 of arm 38b. Thus, actuating the air cylinder 36b will extend or retract the arm 38b in the transverse direction described above. Fixed mount 50b carries left pivot pin 100 with bushing 102 and right pivot pin 46b with bushing 96. Fixed mount 50b is mounted on column adapter plate 98 that is mounted on top of upper column 28b (which corresponds to upper column 28a in FIG. 1). Pivoting mount 48b pivots or rotates in the arc described above.

The arms 38a, 38b, 38c, and 38d support the air motors 26a, 26b, 26c, and 26d, respectively, and the shafts 22a and 22b while allowing movement and control of the location of the shafts 22a and 22b. The movement of the shafts 22a and 22b is required to permit uninterrupted application of tension to the carrier sheet 74 and side pressure on the honeycomb core workpiece 76a while the workpiece 76a is being formed to the desired contour. The arms move rotationally and transversely during the forming process shown in FIGS. 6–9 to allow the workpiece 76a to move during the forming process. Control of the transverse motion creates the ability to increase or decrease the amount of side pressure that the shafts are imparting on the workpiece. This side pressure can be adjusted from zero up to the structural limits of the workpiece. Another advantage of controlling the transverse motion is the ability to locate the shafts to improve the workpiece handling and location. The essential function is that the shafts move with the workpiece and do not lose contact with the workpiece during the forming process.

It should be understood that the specific construction of support tower assemblies 24a, 24b, 24c, and 24d is just one example of the various mechanisms that can be employed to support the shafts 22a and 22b in order to allow the shafts to move with the workpiece during the forming process without losing contact with the workpiece.

The Dedicated Version Of The Apparatus

As explained above, FIG. 1 shows a portable or removable honeycomb core forming restricter. A dedicated or integrated version of the honeycomb core forming restricter is also within the scope of the invention. In the dedicated version of the invention, the honeycomb core forming restricter is integrated into the design of the press. Specifically, the four support tower assemblies are replaced by new support structures of similar design for the same function of supporting the two longitudinal shafts. The new support structures are mounted on the walls of the press area or they are mounted on elements of the press itself. This integrated design eliminates the need for a separate base plate for the honeycomb core forming restricter.

Thus, the dedicated version of the honeycomb core forming restricter includes: (a) a carrier sheet for supporting the workpiece; (b) two shafts supporting the carrier sheet, the shafts being arranged in a generally parallel relationship to each other and to the longitudinal axis of the female die; (c) one or more motors for applying rotational torque to the shafts; and (d) support structures including structures for supporting the shafts and structures for allowing the shafts to move with the workpiece during the forming process without losing contact with the workpiece.

The basic process of utilizing the honeycomb core forming restricter to form simple or complex contours is as follows: (a) Heat the stiff honeycomb core workpiece to the proper forming temperature for the type of honeycomb core workpiece being used. (b) Place the workpiece on the carrier sheet between the shafts and apply torque to the shafts to bring them into contact with the sides of the workpiece and apply tension to the carrier sheet. (c) The workpiece is then formed, while being supported by the carrier sheet and held on the sides by the shafts, and allowed to cool.

The finished product 82 shown in FIG. 10 is formed in a simple contour. A simple contour is a contour in one plane. For example, the simple contour of product 82 in FIG. 10 is a curvature in the vertical plane. The product 82 is straight in the horizontal plane. A complex contour is a contour in more than one plane. FIGS. 12–15 show a preferred process for using the honeycomb core forming restricter 20 to form honeycomb core material into a complex contour.

In FIGS. 12–15, the complex contour male die, the carrier sheet, and the support base are not shown in order to simplify the drawings and to illustrate the preferred process of forming a stiff honeycomb core workpiece into a complex contour.

Figure 12:
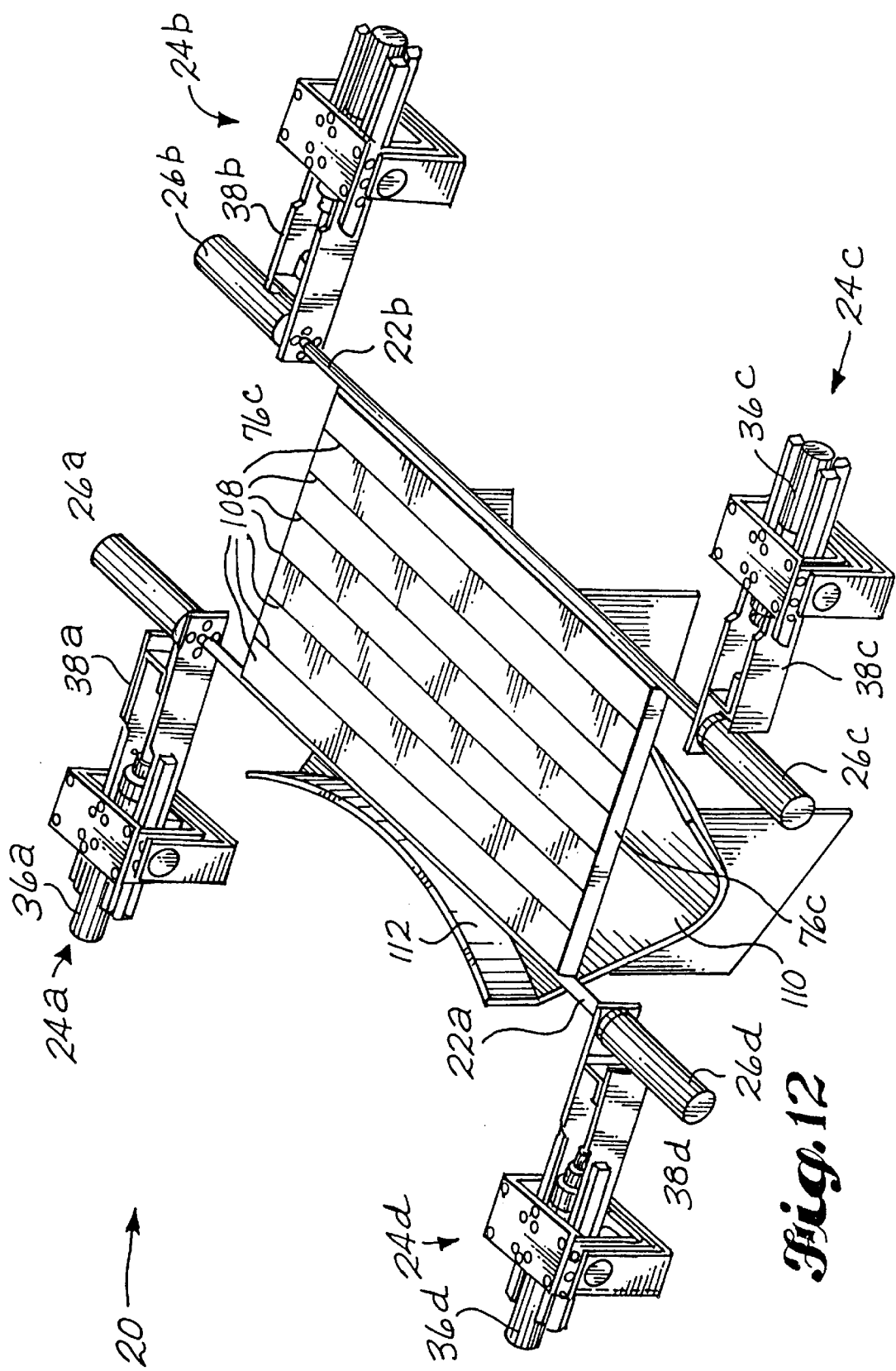
In FIGS. 12–15, the male die, the carrier, and the support base are not shown in order to simplify the drawings and illustrate a preferred process of forming a stiff honeycomb core workpiece into a complex contour.
Figure 13:
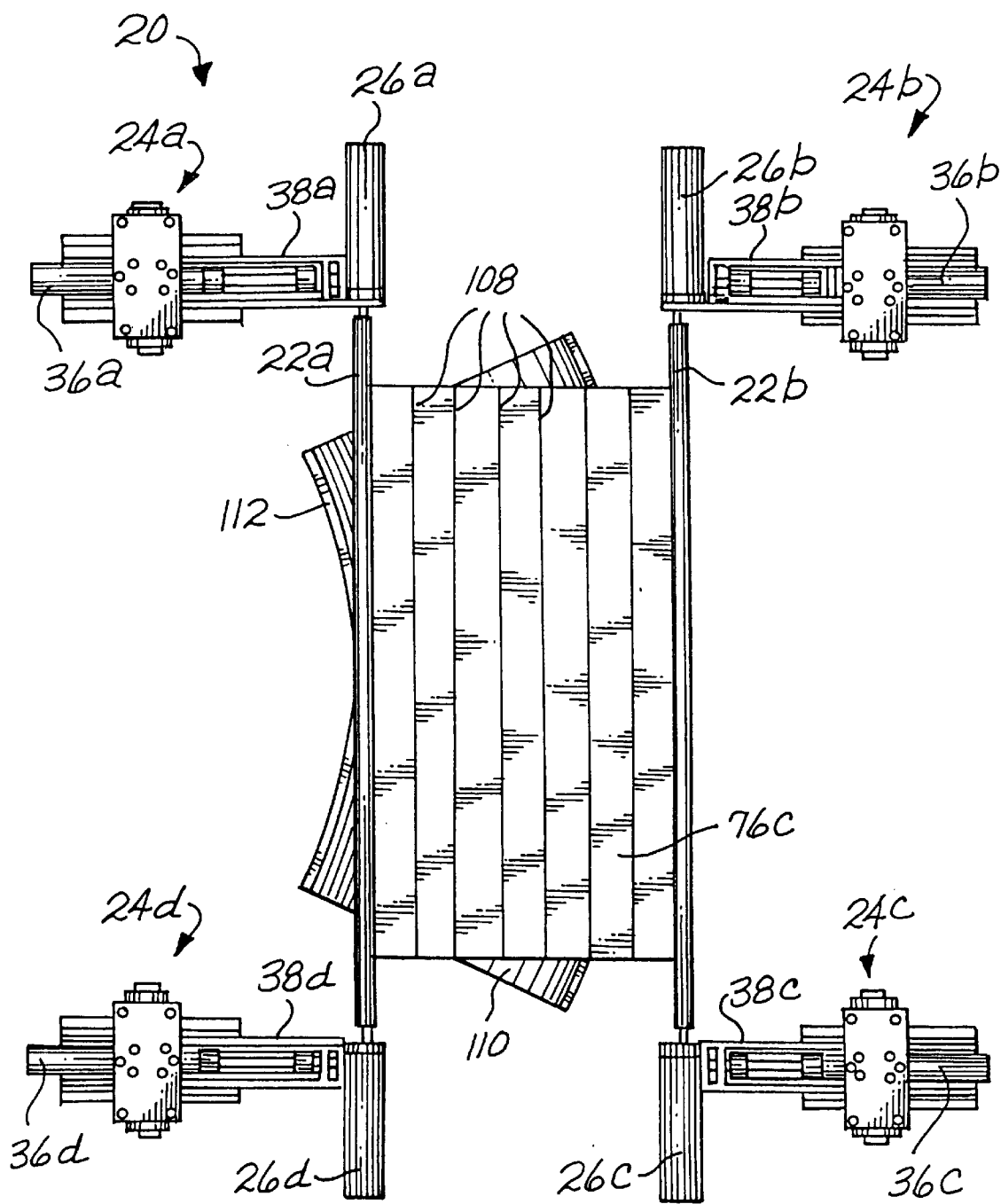

FIG. 12 is a perspective view of the honeycomb core forming restricter 20, the preheated honeycomb core workpiece 76c, and the complex contour female die 110. FIG. 13 is a plan view of the apparatus shown in FIG. 12. FIGS. 12 and 13 show the first stage of the process which is to locate the preheated honeycomb core workpiece 76c into the honeycomb core forming restricter 20 which is in the proper location with respect to the male die (not shown) and the female die 110. Shafts 22a and 22b press against the longitudinal sides of workpiece 76c. In FIGS. 12–15, the lines 108 in the honeycomb core workpiece 76c are a simplified way of indicating the ribbons and the ribbon direction in the honeycomb core material. The ribbon direction of a workpiece of honeycomb core material is the direction of the continuous corrugated strips or ribbons of material which are used to construct the honeycomb material. All of the continuous corrugated ribbons are oriented in one direction in a raw workpiece. The corrugated ribbons are bonded in the direction that is perpendicular to the ribbon direction in order to form the hexagonal cells that make up the honeycomb core material.

The complex contour female die 110 used in this process has a vertical retaining wall 112 on the left side of the die 110. Alternatively, the retaining wall 112 could be replaced by a multiplicity of vertical retaining pins placed in the same location as the retaining wall in FIG. 12. In the first stage shown in FIG. 12, the left shaft 22a is located against the retaining wall 112 of the female die 110.

Figure 14:
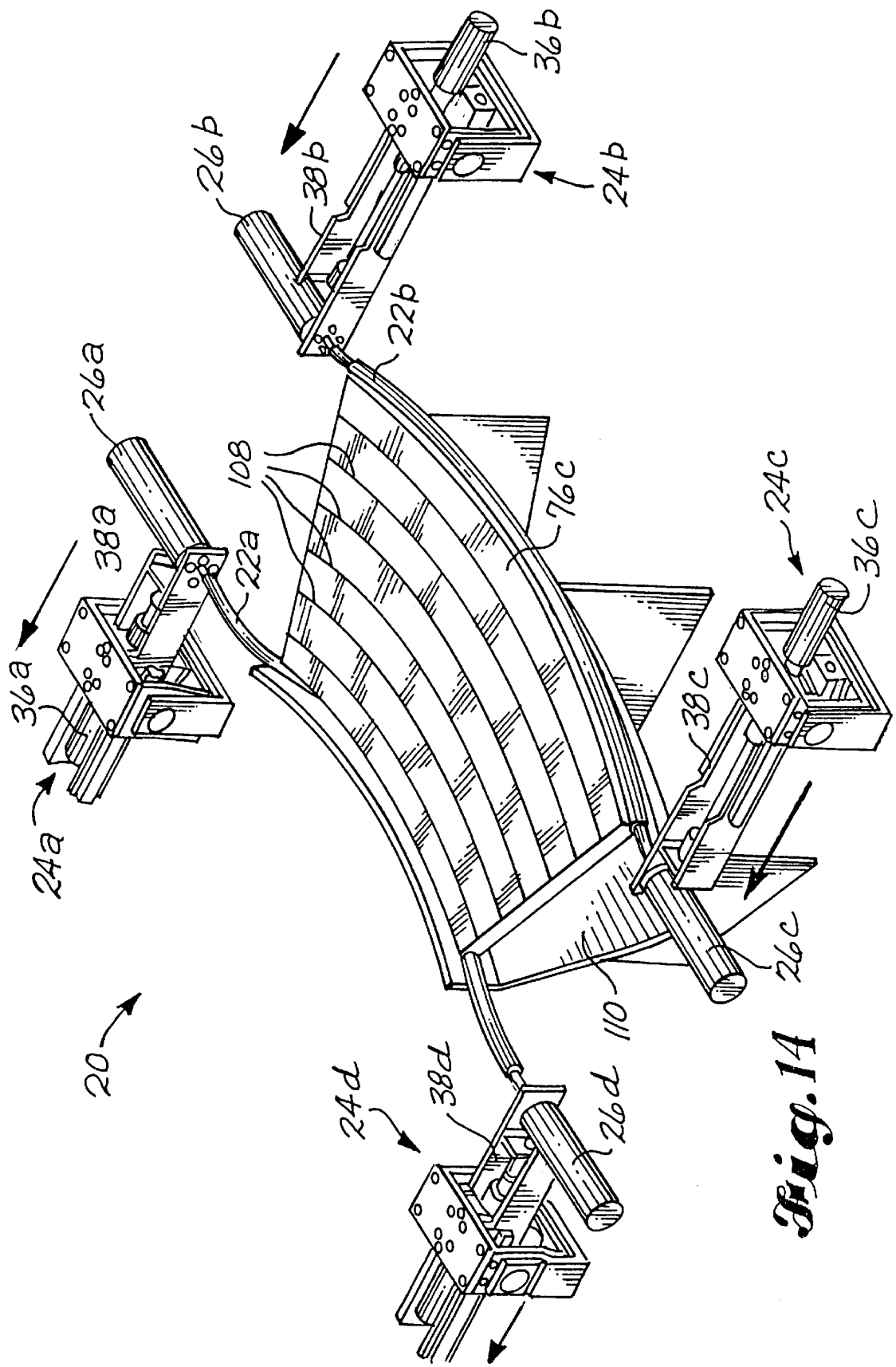

FIG. 14 is a perspective view which shows the second stage of the process which is to form the ribbons 108 in the horizontal plane before forming the complex contour in workpiece 76c. This stage is accomplished by retracting air cylinders 36a and 36d and concurrently extending air cylinders 36b and 36c as shown by the arrows in FIG. 14.

Figure 15:
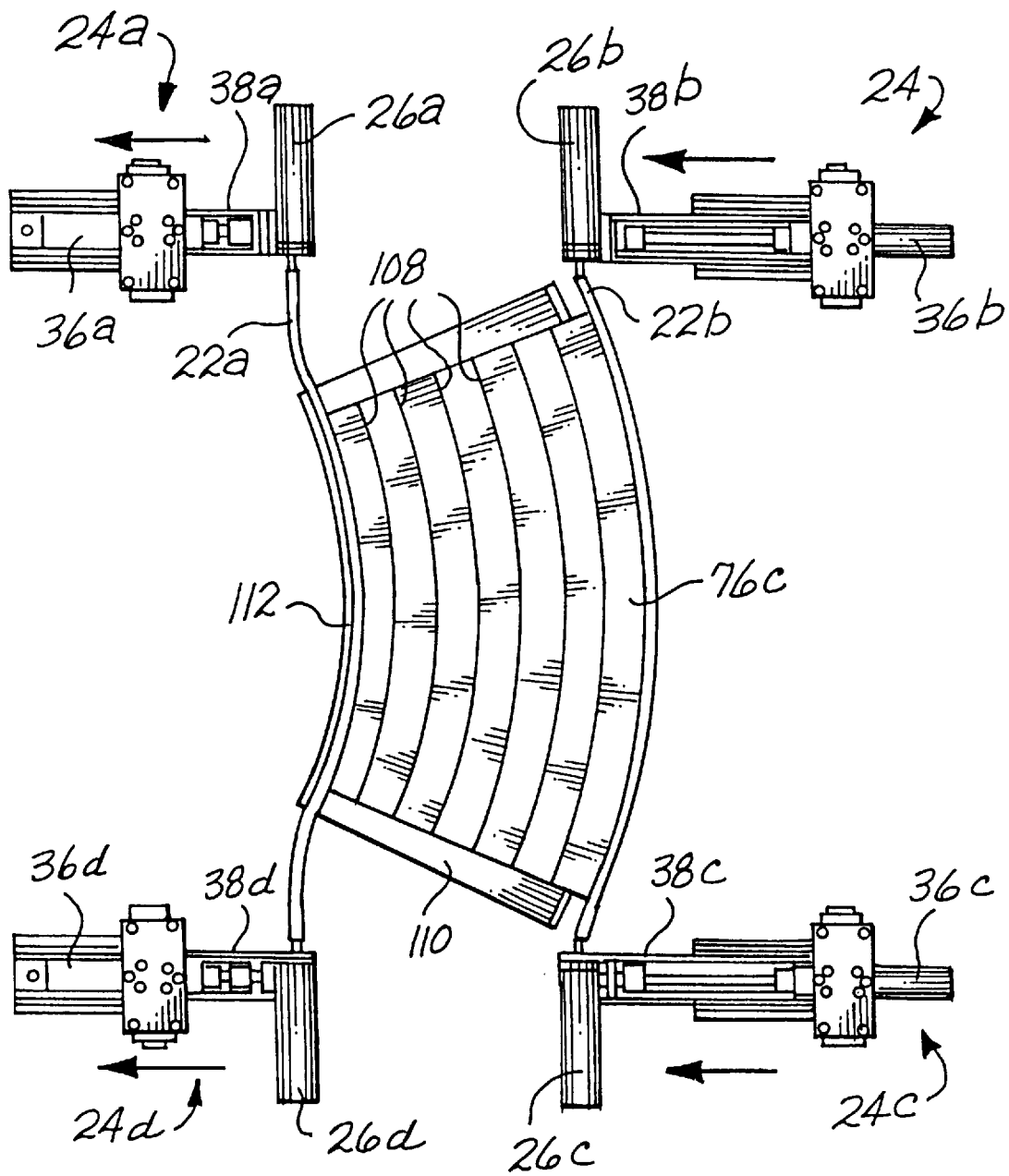

As shown in FIG. 14, this retraction and extension of the air cylinders pulls left shaft 22a laterally to the left and forces left shaft 22a against the retaining wall 112, thereby bending shaft 22a against retaining wall 112. At the same time, right shaft 22b is being pushed laterally to the left. This forces right shaft 22b against workpiece 76c. Right shaft 22b forces workpiece 76c against shaft 22a and retaining wall 112. This causes workpiece 76c to take on the contour of retaining wall 112. Thus, this step forms the ribbons 108 of the workpiece 76c in the horizontal plane into the contour of retaining wall 112. We call this step "in-plane" forming of the ribbons. FIG. 15 shows the in-plane forming of the ribbons 108 in a plan view.

The next stage of the process is for the complex contour male die (not shown) to descend against workpiece 76c, thereby forcing workpiece 76c down into complex contour female die 110 while carrier sheet 74 supports the bottom surface of workpiece 76c. At the same time the male die is forcing workpiece 76c down, shafts 22a and 22b are continuously pressing against the sides of workpiece 76c while it is being formed by the dies and the carrier sheet (not shown) is supporting the bottom surface of workpiece 76c.

Figure 16:
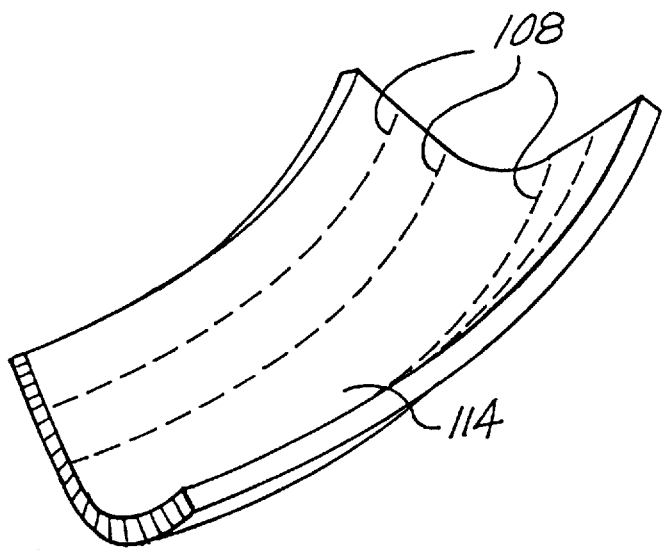
FIG. 16 is a perspective view of the finished product formed in a complex contour made by the process shown in FIGS. 12–15. In the finished product, the ribbon follows the complex contour because of stage two of the process that is in-plane ribbon forming.

FIG. 16 is a perspective view of the finished honeycomb product 114 formed in a complex contour made by the preferred process shown in FIGS. 12–15. In finished product 114, the ribbons 108 follow the complex contour because of stage two of the process which is the in-plane ribbon forming. This is the most cost-effective process for forming a honeycomb workpiece into a complex contour because there is very little or no waste of material from trimming.

The basic process (described above in conjunction with FIGS. 6–9) of utilizing the honeycomb core forming restricter to form a workpiece into a simple contour product may also be used to form a complex contour product. The basic process produces a finished complex contour product 116 as shown in perspective view in FIG. 17 and in plan view in FIG. 18. The product 116 has ribbons that follow a straight line and do not follow the complex contour. This is because the basic process does not include the step of in-plane ribbon forming. Thus, the basic process of making product 116 begins at stage one with a larger raw workpiece in the apparatus shown in FIGS. 12 and 13. But stage two shown in FIGS. 14 and 15 is not performed. The next stage of the basic process is for the complex contour male die to descend against the raw workpiece, thereby forcing the workpiece down into female die 110 while the carrier sheet supports the bottom surface of the workpiece and shafts 22*a* and 22*b* press against the sides of the workpiece while it is being formed by the dies.

Figure 18:
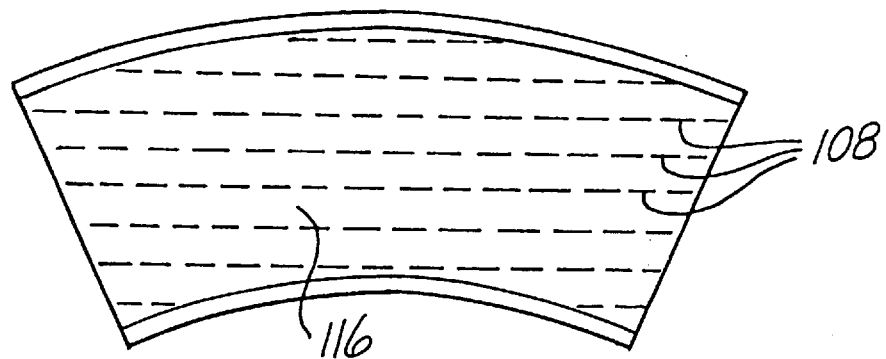
FIG. 18 is a plan view of the product shown in FIG. 17.
Figure 17:
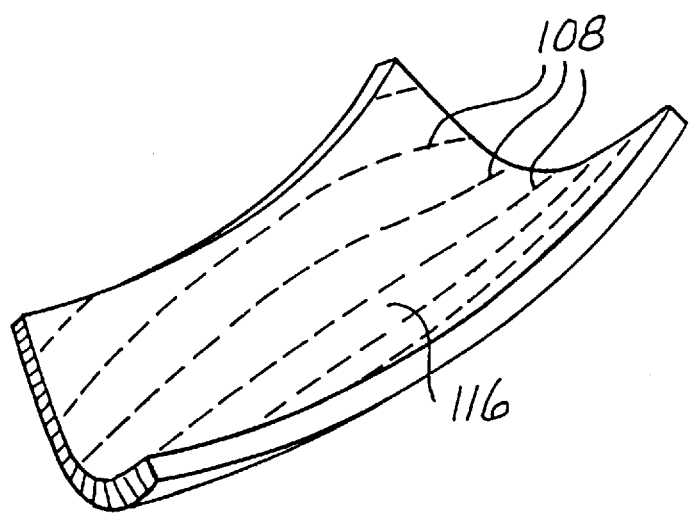
FIG. 17 is a perspective view of the finished product produced by the basic process of forming a workpiece into a complex contour without in-plane ribbon forming.

The complex contour product of the basic process will then require trimming off excess honeycomb material in order to arrive at the final product 116 shown in FIGS. 17 and 18. In product 116, the ribbon direction goes over the complex contour instead of following the complex contour. The reason the basic process is not a cost effective process of making the product 116 is that the process requires a larger starting workpiece and the excess material which is trimmed off is waste.

As will be apparent to those skilled in the art to which the invention is addressed, the present invention may be embodied in forms other than those specifically disclosed above, without departing from the spirit or essential characteristics of the invention. The particular embodiments of the invention described above and the particular details of the processes described are therefore to be considered in all respects as illustrative and not restrictive. The scope of the present invention is as set forth in the appended claims rather than being limited to the examples set forth in the foregoing description. Any and all equivalents are intended to be embraced by the claims.

What is claimed is:

1. A process of forming and shaping a preheated workpiece, said workpiece being made of honeycomb core material and having a top surface, a bottom surface, and side surfaces, by using a press including complementary male and female dies, said process comprising the steps of:

(a) providing a carrier sheet means for supporting said workpiece, said carrier sheet means being suspended over said female die by two shaft means supported by support tower means;

(b) loading said preheated workpiece onto said carrier sheet means suspended over said female die;

(c) applying rotational torque to each of said shaft means whereby said carrier sheet means is wrapped around each of said shaft means thereby applying tension to said carrier sheet means and pulling said shaft means toward each other and into pressing contact with the side surfaces of said workpiece while said carrier sheet means supports the bottom surface of said workpiece;

(d) closing said male die and said female die against said workpiece while maintaining said shaft means in pressing contact with the side surfaces of said workpiece and while said carrier sheet means supports the bottom surface of said workpiece, whereby said workpiece is formed and shaped by said complementary male and female dies into a formed workpiece of desired shape; and (e) opening said male and female dies and removing said formed workpiece.

2. A process of forming and shaping a preheated workpiece, said workpiece being made of honeycomb core material and having a top, a bottom, and side surfaces, into a curved shape in the horizontal plane by using a press including complementary male and female dies and having a curved vertical retaining wall means on one side of said female die, said process comprising the steps of:

(a) providing a carrier sheet means for supporting said workpiece, said carrier sheet means being suspended over said female die by two shaft means supported by support tower means;

(b) loading said preheated workpiece onto said carrier sheet means suspended over said female die;

(c) applying rotational torque to each of said shaft means whereby said carrier sheet means is wrapped around each of said shaft means thereby applying tension to said carrier sheet means and pulling said shaft means toward each other and into pressing contact with the side surfaces of said workpiece while said carrier sheet means supports the bottom surface of said workpiece;

(d) forcing one of said shaft means and said workpiece against said curved vertical retaining wall means thereby causing said workpiece to take on the curved shape in the horizontal plane of said retaining wall means;

(e) closing said male die and said female die against said workpiece while maintaining said shaft means in pressing contact with the side surfaces of said workpiece and while said carrier sheet means supports the bottom surface of said workpiece, whereby said workpiece is formed and shaped by said complementary male and female dies into a formed workpiece of desired shape; and (e) opening said male die and said female die and removing said formed workpiece.

* * * * *